Aug. 23, 1949.  P. L. SHULTZ  2,479,976
AIRCRAFT
Filed Feb. 27, 1946

INVENTOR.
PAUL L. SHULTZ
BY
ATTORNEY

Patented Aug. 23, 1949

2,479,976

UNITED STATES PATENT OFFICE 2,479,976

AIRCRAFT

Paul L. Shultz, Dearborn, Mich.

Application February 27, 1946, Serial No. 650,537

7 Claims. (Cl. 244—104)

This invention relates to landing gear for aircraft.

Broadly, the invention comprehends a simplified and advanced shock absorbing landing gear for small aircraft. The invention possesses several advantages over the prior art, among which are: an exceedingly light structure having relatively few parts as compared to such gear as is now in general use, positive assurance of an equal distribution of the load, and effective yet simple means for absorbing shock.

An object of the invention is to provide a shock absorbing landing gear for aircraft in which the head resistance is greatly reduced.

Another object of the invention is to provide a shock absorbing landing gear for aircraft in which the weight of such a structure may be materially reduced.

Another object of the invention is to provide a shock absorbing landing gear for aircraft having positive action, high efficiency in operation and marked simplicity as a whole and in respect to each of its component parts.

Other objects and advantages of the invention will appear from the following description of the invention when taken in connection with the drawings forming a part of this specification, and in which.

Figure 1:
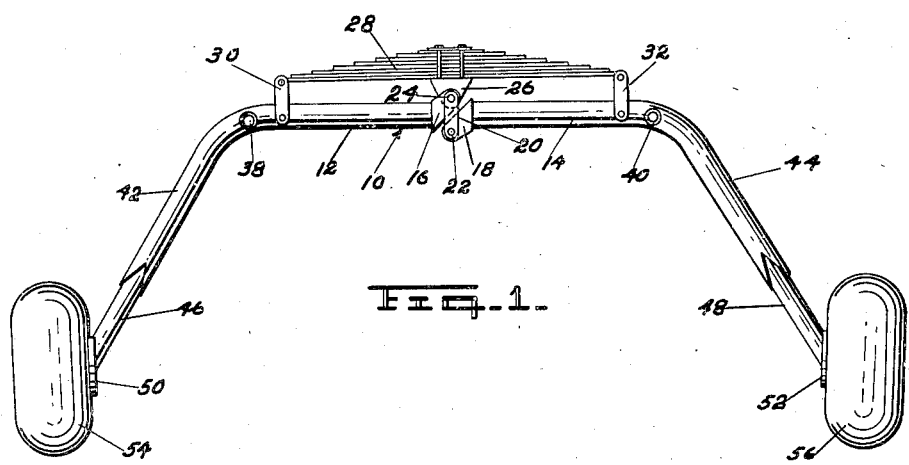
Fig. 1 is a front elevation of a landing gear for aircraft embodying the invention.

Referring to the drawings for more specific details of the invention 10 represents a sectionalized axle tree including corresponding tubular sections 12 and 14 arranged in alignment with one another.

At the adjacent ends of the sections 12 and 14, the section 12 has an upwardly inclined lug 16 and the section 14 has a downwardly inclined lug 18, and corresponding oppositely disposed links 20 have their respective ends pivotally connected to the extreme ends of the lugs as by pintles 22 and 24.

The pintle 24 supports a spring seat 26 having suitably secured thereon a leaf spring 28, and the ends of the spring are respectively connected to the sections 12 and 14 of the axle tree as by corresponding oppositely disposed pairs of links 30 and 32 or any other desirable type of shackle.

The spring 28 constitutes the shock absorbing element of the landing gear. It is desirable that such an element should have a damping characteristic and to that end the leaves 34 of the spring are inter-leaved with a suitable brake lining 36, preferably secured to the bottom of each leaf so as to increase friction between the leaves. This has been found highly efficient in snubbing the rebound incident to the shock of landing.

The outer ends of the axle tree sections 10 and 12 have thereon trunnions 38 and 40 adapted to be received by trunnion bearings, not shown, but suitably secured to the fuselage of aircraft, and beyond the trunnions the axle tree sections 12 and 14 are bent downwardly and outwardly to provide shock strut sections 42 and 44 sufficiently stiff to resist the landing load or moment.

Relatively light shock strut sections 46 and 48 are sleeved into the shock struct sections 42 and 44 and secured against displacement as by welding, and suitably secured to the free ends of the shock strut sections 46 and 48 are spindles 50 and 52 supporting landing wheels 54 and 56 preferably toed slightly inward to present a snubbing effect to side slip when landing.

Figure 2:
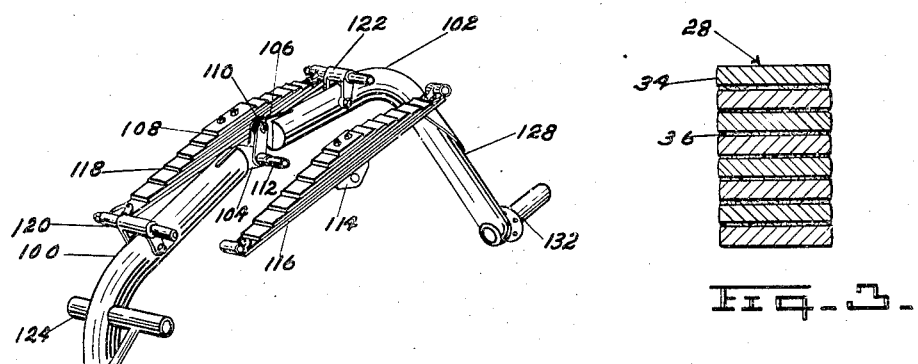
Fig. 2 is a perspective view of a landing gear for aircraft illustrating the use of two shock absorbing elements.
Figure 3:
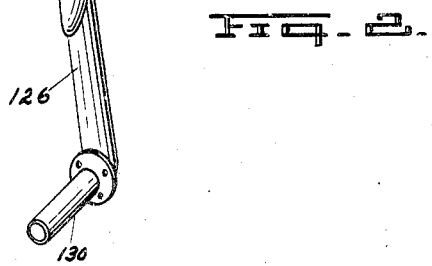
Fig. 3 is a vertical sectional view substantially centrally of one of the shock absorbing elements.

A modification of the invention is illustrated in Fig. 2. In this embodiment of the invention similar axle tree sections 100 and 102 arranged substantially in alignment with one another have suitably secured to their adjacent ends oppositely inclined lugs 104 and 106, and corresponding oppositely disposed links 108 have their ends pivotally connected to the extremities of the lugs as by pintles 110 and 112.

The pintle 112 extends outwardly at both sides of the connection to provide supports for corresponding spring seats 114, only one of which is shown, and leaf springs 116 and 118, preferably of the type shown and described in the preferred embodiment of the invention are suitably secured to the spring seats, and the ends of the springs are respectively connected to the axle tree sections 100 and 102 as by shackles 120 and 122.

The outer ends of the axle tree sections 100 and 102 have thereon trunnions 124, only one of which is shown. The trunnions serve to pivotally mount the landing gear on the fuselage of an aircraft, and the extremities of the axle tree sections 100 and 102 are bent downwardly and outwardly for the reception of shock struts 126 and 128 having on their free ends spindles 130 and 132 for the reception of conventional landing wheels, not shown.

In both embodiments of the invention the axle tree sections and the strut sections provide in effect bell crank levers adapted to be pivotally supported on the fuselage of an aircraft. The axle tree sections are pivotally connected as by links, and a leaf spring pivotally supported at the connection of the axle tree sections has its ends shackled to the sections respectively.

Although this invention has been described in connection with certain specific embodiments, the principles involved are susceptible of numerous other applications that will readily occur to persons skilled in the art. This invention is, therefore, to be limited only by the scope of the appended claims.

Having thus described the various features of the invention, what I claim as new and desire to secure by Letters Patent is:

1. A landing gear comprising corresponding bell crank levers, means connecting the adjacent legs of the levers, a spring pivotally supported on the connection and shackled to the levers.

2. A landing gear comprising corresponding bell crank levers, linkage connecting the adjacent ends of the levers, and a leaf spring supported at the connection and shackled to the levers.

3. A landing gear comprising corresponding oppositely disposed bell crank levers, linkage connecting the adjacent legs of the levers, wheel supports on the other legs of the levers, a leaf spring pivotally supported at the connection of the levers, and shackles connecting the ends of the spring to the levers.

4. A landing gear comprising corresponding oppositely disposed axle tree sections arranged substantially in alignment, linkage connecting the opposed ends of the sections, trunnions on the sections, struts rigidly connected to the free ends of the sections, wheel supports on the struts, a leaf spring pivotally mounted on the linkage, and shackles connecting the ends of the spring to the sections respectively.

5. A landing gear comprising corresponding oppositely disposed axle tree sections arranged in alignment with one another, links pivotally connecting the opposed ends of the sections, means for pivotally supporting the sections, a spring seat pivotally supported on one of the opposed ends, a leaf spring secured to the seat, shackles connecting the ends of the spring to the axle tree sections, struts secured to the free ends of the axle tree sections and wheel supports on the struts.

6. A landing gear comprising oppositely disposed axle tree sections arranged substantially in alignment with one another, links pivotally connecting the opposed ends of the sections, means for pivotally supporting the sections, springs pivotally supported on one of the opposed ends of the sections in parallel relation to one another, shackles connecting the ends of the springs to the sections, struts secured to the free ends of the axle tree sections and wheel supports on the struts.

7. A landing gear comprising corresponding oppositely disposed axle tree sections arranged substantially in axial alignment, links pivotally connecting the sections, pivotal means on the sections for support thereof, spring seats pivotally supported on one of the opposed ends of the sections, leaf springs mounted on the seats on opposite sides of the sections, shackles connecting the ends of the springs to the sections, struts secured in the free ends of the sections and wheel supports on the struts.

PAUL L. SHULTZ.

REFERENCES CITED

The following references are of record in the file of this patent:

UNITED STATES PATENTS

| Number | Name | Date |
|---|---|---|
| 975,403 | Dunne | Nov. 15, 1910 |
| 1,345,833 | Caproni | July 6, 1920 |
| 1,685,119 | Carnes | Sept. 25, 1928 |
| 2,236,868 | Cook | Apr. 1, 1941 |
| 2,317,291 | McIntyre | Apr. 20, 1943 |
| 2,326,210 | Falk | Aug. 10, 1943 |

FOREIGN PATENTS

| Number | Country | Date |
|---|---|---|
| 22,011 | Great Britain | 1895 |
| 393,445 | Great Britain | June 8, 1933 |
| 453,633 | France | Apr. 9, 1913 |
| 518,880 | Great Britain | Mar. 11, 1940 |